Patented Apr. 25, 1944

2,347,627

UNITED STATES PATENT OFFICE 2,347,627

ESTERS OF BIS-(2-CARBOXYETHYL) ETHER

Herman A. Bruson, Philadelphia, Pa., assignor to The Resinous Products & Chemical Company, Philadelphia, Pa., a corporation of Delaware No Drawing. Application April 15, 1942, Serial No. 439,079

3 Claims. (Cl. 260—484)

This invention relates to esters of bis-(2-carboxyethyl)-ether and non-tertiary monohydric alcohols and a method for their preparation.

According to this invention, esters of bis-(2-carboxyethyl)ether and monohydric alcohols having the formula $$O(CH_2CH_2COOR)_2$$

wherein R is the monovalent organic radical of any monohydric primary or secondary alcohol, are obtained by reacting bis-(2-cyanoethyl)-ether with two molecular equivalents each of water and a strong mineral acid, such as hydrochloric or sulfuric acid, at a temperature below 90° C. to hydrolyze the nitrile groups and subsequently heating the hydrolysis products with a non-tertiary monohydric alcohol at a temperature not exceeding 130° C. in the presence of an acid catalyst.

The preparation of bis-(2-cyanoethyl) ether is described in application Serial No. 373,944, filed January 10, 1941, of which the present application is a continuation-in-part.

As an alcohol there may be used any non-tertiary monohydric alcohol, in which the hydroxyl group is the only functional group readily capable of reacting with a carboxyl group. The alcohol may be saturated or unsaturated. Typical alcohols which may be used include methyl, ethyl, propyl, isopropyl, butyl, isobutyl, hexyl, octyl, undecyl, dodecyl, octadecyl, chloroethyl, allyl, methallyl, undecenyl, oleyl, methoxyethyl, ethoxyethyl, butoxyethyl, caproxyethyl, ethoxypropyl, ethoxybutyl, chloroethoxyethyl, ethoxyethoxyethyl, phenoxyethyl, phenoxyethoxyethyl, benzyl, chlorobenzyl, methylbenzyl, cyclohexyl, methylcyclohexyl, bornyl, camphyl, tetrahydroabietyl, tetrahydrofurfuryl, etc. The aliphatic alcohols, particularly those having four or more carbon atoms in a hydrocarbon chain and those having ether groups, give diesters of bis-(2-carboxyethyl)-ether of unusual interest and value.

It has been found that the ether linkage in bis-(2-cyanoethyl)-ether and its derivatives is extremely unstable to alkalies or acids and is readily split so that the ordinary methods of preparing esters from cyano groups fail in this particular case.

In the first step of preparing the esters of this invention from bis(2-cyanoethyl)-ether hydrolysis is involved and the corresponding amide and acid are formed. It is not usually necessary to isolate the hydrolysis products, although this may be done. It is often desirable to cool the reaction mixture after hydrolysis and to separate any ammonium salt, such as sulfate or chloride, which may have crystallized out. In some cases it is desirable to neutralize excess mineral acid. This usually causes the formation of crystals of salts which should be separated. In case all of the strong mineral acid should be neutralized, it is necessary to add a small amount of strong acid at this point to act as a catalyst in the esterification step.

Before esterification is carried out, it is generally expedient to add to the hydrolysis products an inert liquid such as toluene or benzene. The alcohol to be reacted is mixed with the hydrolysis products and the mixture stirred and heated. The heating is preferably conducted under reflux conditions which permit the removal of water and return of solvent, if used, and alcohol. When water is no longer formed, any solvent or excess alcohol may be removed by distillation. The esters may then be purified, if desired, by suitable and conventional procedures. The lower esters are in general distillable under reduced pressure. Higher esters may be obtained in sufficiently pure form after being washed with water, freed from acid catalyst, and stripped of solvent and/or excess alcohol.

The esters are useful as plasticizers for synthetic resins and as intermediates for preparing acrylic derivatives.

The invention is illustrated by the following examples, in which parts are by weight.

*Example 1.*—A solution consisting of 200 parts of 98% sulfuric acid and 36 parts of water is added dropwise to 124 parts of bis-(2-cyanoethyl)-ether during the course of two hours while the reaction mixture is stirred and maintained at 58–60° C. The mixture is then heated for an additional 5 hours at 60° C., and a mixture of 185 parts of n-butanol and 230 parts of toluene finally added. The whole is boiled under reflux for 9½ hours, cooled, and the oil layer separated and washed with water followed by successive washings with sodium carbonate solution and water. The dried oil layer is then distilled to remove the solvent from the less volatile portion which is then fractionally distilled under reduced pressure. The di-n-butyl ester having the formula Butyl OOCCH$_2$—CH$_2$—O—CH$_2$CH$_2$COO Butyl distills over at 150–155° C./1 mm. as a colorless oil. The yield is 218 parts. Upon redistillation at 10 mm. it boils at 178–180° C. and possesses the following constants—

$N_D^{25}$ 1.4347; sp. gr. at 25° C. 0.9954

*Example 2.*—To 115 parts of bis-(2-cyanoethyl)-ether 186 parts of concentrated hydrochloric acid (37%) is gradually added while the mixture is stirred and held at 65° C. After all of the acid has been added, the mixture is kept at 65° C. for five hours and then evaporated to dryness at 90° C. under reduced pressure on a steam bath. The semi-solid mixture is extracted with 300 parts of allyl alcohol and filtered. The filtrate is mixed with 200 parts of toluene and boiled under a reflux condenser attached to an automatic water separator until no more water collects in the distillate, the toluene being continuously returned to the reaction vessel. This requires about three hours. The reaction product is cooled, washed with water, then with soda solution, and again with water. The toluene and excess allyl alcohol are distilled off and the residual oil fractionated under reduced pressure. The di-allyl ester having the formula—

CH₂=CH—CH₂OCOCH₂CH₂—O—
 CH₂CH₂COO—CH₂—CH=CH₂ distills over at 135–140° C./3 mm. as a colorless oil. The yield is 106 parts.

*Example 3.*—A solution of 200 parts of 98% sulfuric acid and 36 parts of water is added gradually to 124 parts of bis-(2-cyanoethyl)-ether during the course of two hours while the reaction mixture is stirred and maintained at 60° C. This reaction mixture is then heated at 60–65° C. for five hours and a mixture of 200 parts of toluene and 225 parts of β-ethoxy-ethanol ("Cellosolve") added. The whole is then boiled at 109–117° for 8 hours under reflux, then cooled, and washed successively with water, soda solution, and finally water. The oil is fractionated by distillation to recover the toluene and excess "Cellosolve" and the residue is distilled under reduced pressure. The di(β-ethoxy-ethyl) ester having the formula—

C₂H₅—O—CH₂CH₂OCOCH₂CH₂—O—
 CH₂CH₂COOCH₂CH₂—O—C₂H₅ distills over at 165–185°/4–5 mm. as a colorless oil in a yield of 145 parts.

*Example 4.*—The procedure described in Example 1 is employed with substitution of 220 parts of isobutyl carbinol for the n-butanol. The di-isoamyl ester having the formula—

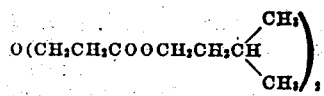

is obtained as a colorless liquid boiling at 170–175°/6 mm. in a yield of 229 parts.

*Example 5.*—(a) The procedure described in Example 1 is employed with the substitution of 325 parts of α-ethyl hexanol for the ni-butanol. The di-α-ethyl hexyl ester having the formula—

O(CH₂CH₂COOC₈H₁₇)₂ is obtained as a colorless oil boiling at 190–200°/2 mm. in a yield of 258 parts.

(b) By using 325 parts octanol-2(capryl alcohol) as in (a), the di-sec-octyl ester is obtained as a colorless oil boiling at 190–198°/3 mm. in a yield of 165 parts.

*Example 6.*—The procedure described in Example 3 is used except that 295 parts of β-butoxy-ethanol is used in place of β-ethoxy-ethanol. The product consisted of 174 parts of the di-β-butoxyethyl ester having the formula—

C₄H₉—O—CH₂CH₂OCOCH₂CH₂—O—
 CH₂CH₂COOCH₂CH₂—O—C₄H₉ said product being a colorless oil boiling at 175–185°/1–2 mm.

*Example 7.*—The procedure described above is used except that 255 parts of tetrahydrofurfuryl alcohol is employed in place of the β-butoxy-ethanol. The di-tetrahydrofurfuryl ester obtained is a colorless oil boiling at 210–220° C./1–2 mm.

I claim:

1. As a new compound, a diester of bis-(2-carboxyethyl)-ether and a non-tertiary monohydric aliphatic ether alcohol.

2. As a new compound,

C₂H₅OCH₂CH₂OOCCH₂CH₂OCH₂CH₂COOCH₂CH₂OC₂H₅

3. As a new compound,

C₄H₉—O—CH₂CH₂OOCCH₂CH₂—O—
 CH₂CH₂COOCH₂CH₂—O—C₄H₉

HERMAN A. BRUSON.